Figure 1:
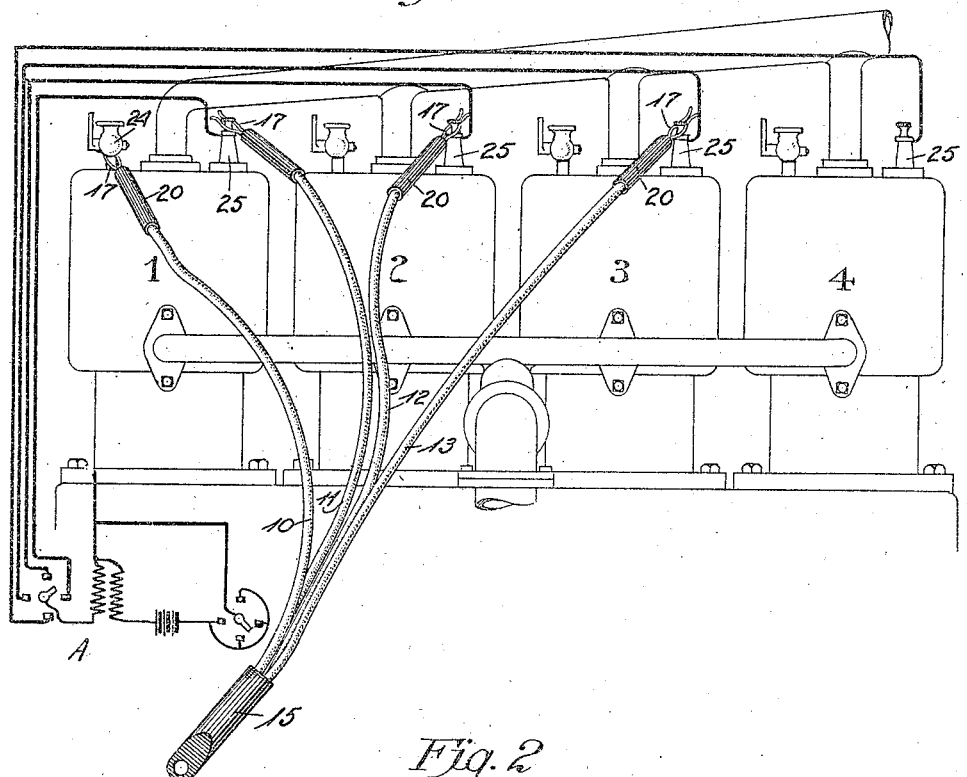

M. B. THURBER.
MISFIRING-TESTING DEVICE FOR MULTIPLE CYLINDER ENGINES.
APPLICATION FILED OCT. 21, 1914.

1,279,380. Patented Sept. 17, 1918.

WITNESSES
J. M. Wells
C. Bradway

INVENTOR
Matt B. Thurber
BY
ATTORNEYS

UNITED STATES PATENT OFFICE.

MATT B. THURBER, OF TECUMSEH, NEBRASKA.

MISFIRING-TESTING DEVICE FOR MULTIPLE-CYLINDER ENGINES.

1,279,380.  Specification of Letters Patent.  Patented Sept. 17, 1918.

Application filed October 21, 1914. Serial No. 867,788.

*To all whom it may concern:*

Be it known that I, MATT B. THURBER, a citizen of the United States, and a resident of Tecumseh, in the county of Johnson and State of Nebraska, have invented a new and Improved Misfiring-Testing Device for Multiple-Cylinder Engines, of which the following is a full, clear, and exact description.

This invention relates to a testing device for ascertaining which cylinder or cylinders of a multiple cylinder engine is or are misfiring, being due to a variety of causes, such as a fouled spark plug; failure of the current to reach the spark plug because of an open or grounded circuit; failure of compression due to leaky valves, piston rings or other leaks; improper mixture of gas with air, due to the leak in the intake manifold, etc.

The invention has for its general objects to provide a device which is easily and quickly applied to the engine when any cylinder or cylinders fail to operate efficiently, to determine which cylinder is affected, the device being of such a nature that it is applied to the insulated electrodes of the spark plugs in all the cylinders except the cylinder to be tested, and also connected with the body of the engine so that as the engine is operated the cylinder to be tested will fail to ignite if the spark plug thereof is not operating properly or because of other abnormal conditions. If the spark plug or cylinder is in proper condition the charge of mixture will of course explode and show that the cylinder is not affected. Another cylinder is then selected to be tested by detaching the device from the spark plug thereof and attaching it to the plug of the cylinder previously tested, so that all of the spark plugs, except the new cylinder that is to be tested, will be grounded, and when the engine is again started or cranked the condition of the second cylinder will be determined by the fact that the charge fails to fire, or fires with a weak or normal impulse.

More specifically the object of the invention is to provide a gas engine cylinder testing device which comprises a plurality of connected or grounded wires which correspond in number to the number of cylinders in the engine with which the device is used, and each wire is provided with a clip whereby it can be easily and quickly connected with the insulated electrodes of the spark plugs and with a priming cup or other grounding part, whereby simultaneously all of the spark plugs except one can be grounded, so that in the ignition system there will be only one spark plug which will not be short circuited, and the condition of this plug or the cylinder containing it will be determined by its ability or inability to fire the charge in the cylinder to which it is attached.

With such objects in view, and others which will appear as the description proceeds, the invention comprises various novel features of construction and arrangement of parts which will be set forth with particularity in the following description and claims appended hereto.

Figure 2:
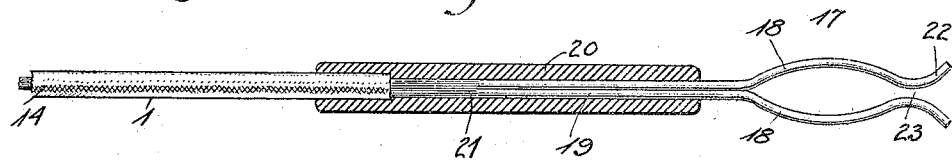
Figure 3:
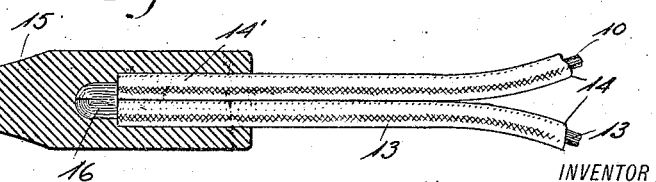

In the accompanying drawing, which illustrates one embodiment of the invention, and wherein similar characters of reference indicate corresponding parts in all the views, Figure 1 is a perspective view of the testing device shown applied to a four-cylinder engine for testing one of the cylinders thereof;

Fig. 2 is an enlarged sectional view of the clip on the free end of each wire of the device; and Fig. 3 is a sectional view of the handle of the device, showing the common connection for the several wires.

In the present instance the testing device is shown with four wires 10, 11, 12 and 13, so that it can be used with an engine having two, three or four cylinders, but with an engine having a larger number of cylinders more wires are required, as the device must have at least as many wires as there are cylinders in the engine to be tested. The wires are covered with insulation 14 and no parts are exposed except the attaching clips, so that there is no danger of the user receiving shocks. The wires at one end are fastened in a socket 14' of a handle 15 made of insulating material, and the several wires are connected or grounded at 16 within the handle. On the free end of each wire is a clip 17 formed of oppositely disposed wire members or jaws 18 which have straight shank portions 19 covered by a sleeve 20 of insulation, and within the sleeve, which forms a handle for the clip, the shanks 19 of the two members of the clips are electrically connected at 21 with the metal conductor of the wire. The clip members 18 are so constructed that they can be easily and quickly attached to or removed from the spark plug central electrode, and therefore the members 18 have their extremities oppositely bent to form lips 22, which at their inner portions coöperate to form a contracted mouth 23, and inwardly from the mouth the members are oppositely bowed to form the jaws proper which grip the outer extremities of the spark plugs on the priming cups or the like.

In using the device no alterations are made in the ignition system A, as by changing the regular wiring or disconnecting any of the parts, since the object of the device is merely to ground all of the spark plugs at one time except the one in the cylinder to be tested. Each spark plug has an insulated electrode, and it is therefore merely necessary to attach the clips 17 to the nuts on the outer ends of the insulated electrodes and attach one of the wires to the body of the engine, as for instance, by snapping the clip of such wire on a priming cup. This application of the device is shown in Fig. 1, where the wire 10 is attached to a priming cup 24 and the wires 11, 12 and 13 are attached to the spark plugs 25 of the cylinders 1, 2 and 3, whereby the device will enable cylinder 4 to be tested. If cylinder 4 is misfiring the engine will of course stop as soon as the testing device is applied to the engine as described, but if the mixture in cylinder 4 continues to explode the user will know that some other cylinder needs to be tested, and accordingly the wire 13 will be detached from the spark plug of cylinder 3 and attached to the spark plug of cylinder 4, so that all the other spark plugs but that of cylinder 3 will be grounded, and when the engine is operated the condition of this spark plug will be determined. In this manner the spark plugs of the various cylinders are tested. Obviously the device is only used when the operator is aware of one or more of the spark plugs being out of order, and when not in use the device is either carried in the tool kit of the automobile or hung up in the garage.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. A testing tool adapted to be applied to the spark plugs of a multiple cylinder engine and normally disconnected therefrom, said tool comprising a plurality of flexible conductors, a handle in which all of the conductors are anchored and electrically connected together, and attaching clips on the outer extremities of the conductors.

2. As an article of manufacture, a testing device of the class described comprising a plurality of flexible conductors electrically connected, a clip composed of wire members connected with each conductor, and a sleeve on each conductor and in which the clip thereof is fastened, whereby the sleeve forms a handle for the clip.

3. A device of the class described comprising a plurality of flexible conductors electrically connected, a clip composed of wire members connected with each conductor, a sleeve on each conductor and in which the clip thereof is fastened, whereby the sleeve forms a handle for the clip, and a handle in which all the conductors at the ends opposite from the clips are fastened.

4. A testing tool adapted to be applied to the spark plugs of a multiple cylinder engine and normally disconnected therefrom, said tool comprising a plurality of flexible conductors, a support to which all of the conductors are anchored and electrically connected together, and attaching clips on the outer extremities of the conductors.

In testimony whereof I have signed my name to this specification in the presence of two subscribing witnesses.

MATT B. THURBER.

Witnesses:
FRANK L. DINSMORE,
EMMA M. MADDEN.